Jan. 20, 1959 — D. E. ROYER — 2,869,564
GOVERNOR VALVE ASSEMBLY
Filed June 10, 1954 — 2 Sheets-Sheet 1
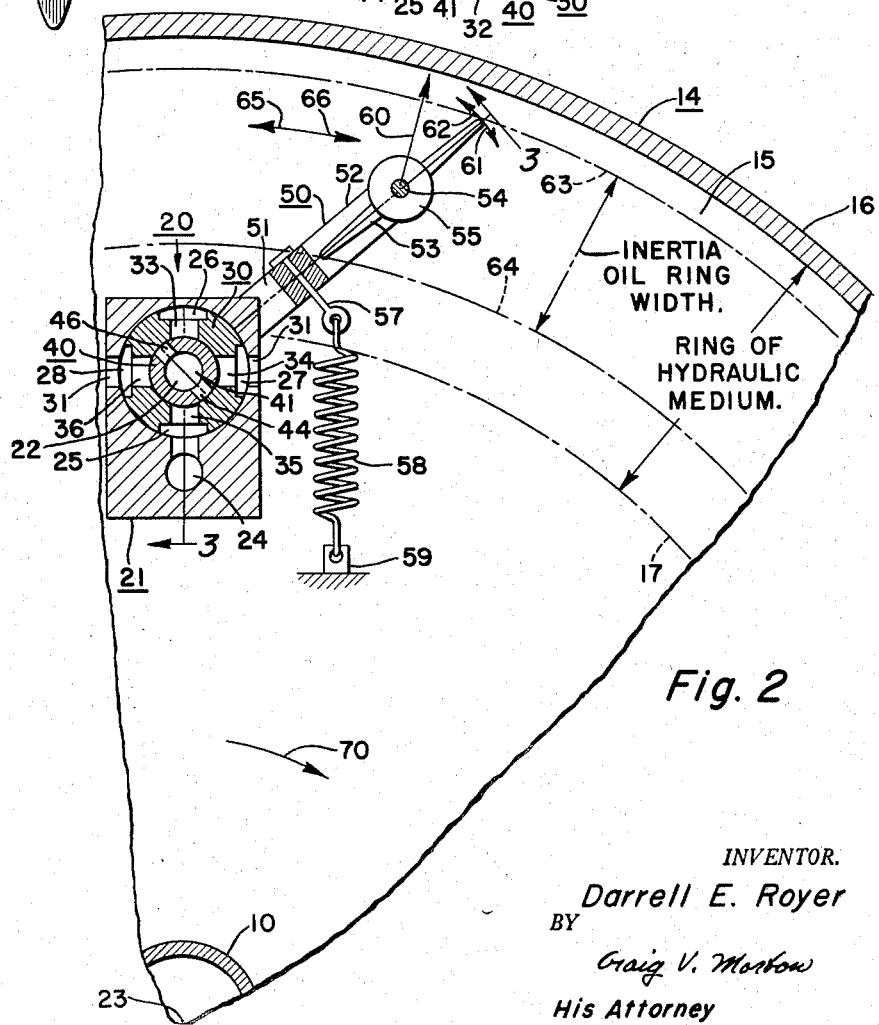
INVENTOR.
Darrell E. Royer
BY
Craig V. Morrow
His Attorney Jan. 20, 1959 D. E. ROYER 2,869,564
GOVERNOR VALVE ASSEMBLY
Filed June 10, 1954 2 Sheets-Sheet 2

INVENTOR.
Darrell E. Royer
BY
Craig V. Morton
His Attorney

United States Patent Office 2,869,564
Patented Jan. 20, 1959

2,869,564

GOVERNOR VALVE ASSEMBLY

Darrell E. Royer, Vandalia, Ohio, assignor to General Motors Corporation, Detroit, Mich., a corporation of Delaware Application June 10, 1954, Serial No. 435,897

6 Claims. (Cl. 137—48)

This invention pertains to governors, and particularly to a governor having speed and acceleration sensitivity.

Heretofore, governors have been designed which incorporate means sensitive to both the amount of off-speed and the rate of change of off-speed, or acceleration. However, in prior devices of this character, and particularly in those wherein the governor controlled, or constituted, a valve in a fluid pressure system, the flow forces affected the calibration and operation of the acceleration sensitive means. Furthermore, in prior devices, the acceleration correction rate could not be adjusted without affecting the off-speed correction rate. Accordingly, among my objects are the provision of a governor having speed and acceleration sensitivity; the further provision of a governor controlled valve including acceleration sensitive means which are substantially unaffected by flow forces; and the still further provision of a governor having means for adjusting the correction rate of the acceleration sensitive means without affecting the correction rate of the speed sensitive means.

The aforementioned and other objects are accomplished in the present invention by incorporating means responsive to centrifugal force for controlling speed sensitivity and means responsive to inertia forces for controlling acceleration sensitivity. Specifically, the governor of this invention is adapted for use with propeller mechanism of the general type disclosed in the Blanchard, et al. Patents 2,307,101 and 2,307,102. Propeller mechanism of this type includes a rotatable regulator structure containing a quantity of hydraulic medium and within which the control valves are disposed. The governor of this invention is constructed and arranged for operation in this type of regulator, and, in fact, its operation is dependent upon an environment of this type.

The governor includes a rotary valve which is supported in a rotatable casing. The valve and casing are supported by a valve housing, or pad, which is adapted for attachment to the regulator in such a manner that the axes of the casing and valve are spaced from but in parallel alignment with the horizontal propeller axis. The rotary valve is operatively connected to a centrifugally responsive arm disposed in the regulator, movement of the arm under the urge of centrifugal force being opposed by a spring. The arm carries an adjustable vane that is disposed in a ring of fluid medium which forms during rotation of the regulator. The inertia forces imparted to the valve and opposed by the spring provide acceleration sensitivity, while the centrifugal force to which the arm is subjected as opposed by the spring provide speed sensitivity. Moreover, the correction rate of the acceleration sensitive means can be varied without in any way affecting the correction rate of the speed sensitive means by merely varying the vane angle so as to vary the width of the oil ring traversed thereby.

The governor of this invention is adapted to operate a servo actuated valve, which, in turn, controls the pitch position of the propeller. Thus, the governor valve would be incorporated in a fluid pressure system including a source of fluid pressure, a servo actuated pitch controlling valve, servo-motor means for adjusting propeller pitch, and various other adjuncts. The governor valve and casing are arranged in follow-up relation such that when the arm senses an off-speed, the valve will move relative to the casing, thereby affording fluid medium to the servo actuated valve, which will move in response thereto so as to apply pressure fluid to the servo-motor so as to correct for the off-speed. Movement of the servo actuated valve will also position the governor valve casing in a follow-up manner, as will be more particularly described hereinafter.

Further objects and advantages of the present invention will be apparent from the following description, reference being had to the accompanying drawing wherein a preferred embodiment of the present invention is clearly shown.

In the drawing:

Fig. 1 is a fragmentary view, in elevation, of a variable pitch propeller including the governor valve assembly of this invention.

Fig. 2 is an enlarged fragmentary sectional view taken along line 2—2 of Fig. 1.

Fig. 3 is a sectional view taken along line 3—3 of Fig. 2.

Figure 4:
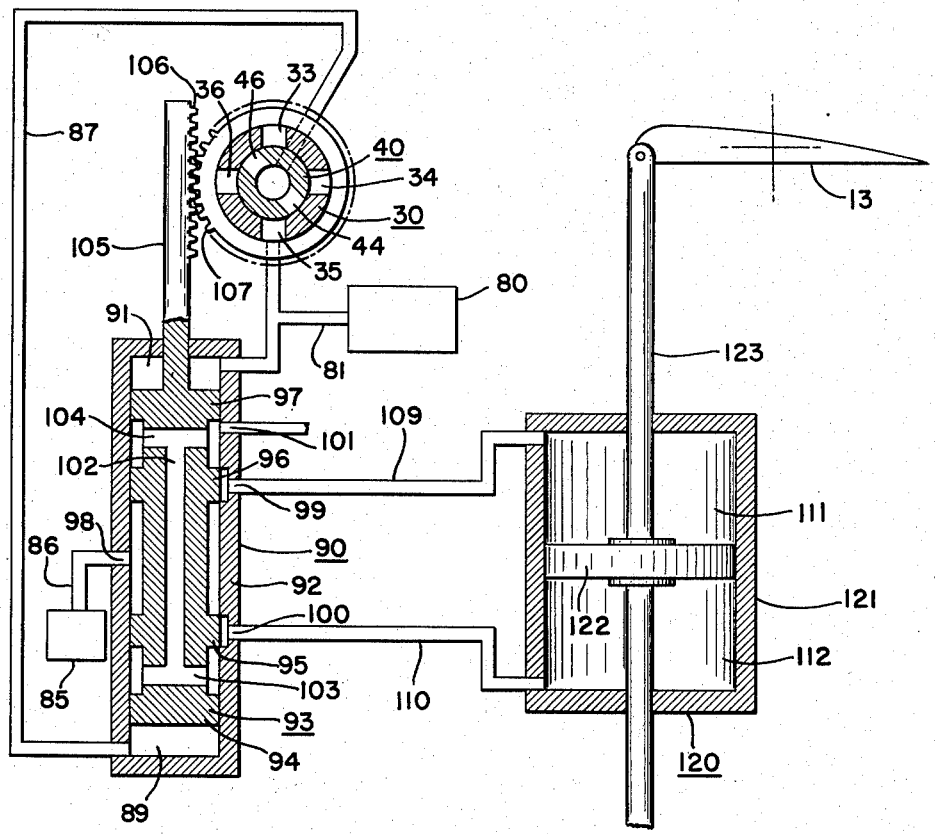
Fig. 4 is a schematic view of a simplified fluid pressure system incorporating the governor valve of this invention.

With particular reference to Fig. 1, a variable pitch propeller is shown including an engine driven shaft 10, which is operatively connected to a propeller hub 11 having a plurality of radially extending, circumferentially spaced blade retaining sockets 12 within which propeller blades 13 are supported for rotation about their longitudinal axes to various pitch positions. The propeller, as shown in Fig. 1, is preferably constructed in accordance with the aforementioned Blanchard, et al. patents and, consequently, includes a rotatable regulator structure 14 which is attached to and rotatable with the hub 11. The regulator structure houses a fluid pressure system for operating blade angle changing servo-motors, which are disposed in the root portions of the blades 12 and operatively connected thereto for imparting pitch changing movement to the blades.

In accordance with the teachings of the aforementioned Blanchard, et al. patents, the rotatable regulator structure 14 includes a front plate 15 to which the various control valves are attached. The regulator structure 14 also includes a cup-shaped cover member 16, and the annular chamber within the regulator contains a quantity of hydraulic medium. During rotation of the propeller, the regulator structure 14 will also rotate and, accordingly, the quantity of hydraulic medium within the regulator will be displaced by centrifugal force so as to form a ring of oil adjacent the outer periphery of the cover 16, the width of the ring of oil being indicated generally by the dotted line 17 in Fig. 2. With particular reference to Fig. 2, the governor valve assembly of this invention is depicted generally by the numeral 20. The governor valve assembly 20 includes a mounting pad 21, or valve housing, which is attached to the front plate 15 of the regulator structure 14. The pad 21 rotatably supports a valve casing 30 within which a valve 40 is rotatably supported, the casing and valve being coaxially arranged. Furthermore, the pad 21 is attached to the front plate 15 so that the axes of the casing and valve, indicated by numeral 22, are in parallel alignment with although radially spaced from the horizontal axis 23 of the propeller.

With particular reference to Figs. 2 and 3, it may be seen that the governor valve supporting pad 21 is formed with a passage 24, which is adapted to communicate with an opening in the front plate 15, the purpose of which will be described more particularly hereinafter. The passage 24 communicates with two longitudinally extending slots 25 and 26, which connect with supply ports 33 and 35. One end of the casing 30 is formed with a drain port 31 and the other end of the casing is formed with a control port 32, which, likewise, communicates with a passage formed in the front plate 15 of the regulator. The casing 30 is also formed with four circumferentially spaced, radially disposed ports 33, 34, 35 and 36, the centerlines of the ports 33 through 36 being spaced 90° apart, 33 and 35 being supply ports, and 34 and 36 being drain ports. The ports 33 and 35 connect with longitudinal slots 26 and 25, respectively, while the ports 34 and 36 communicate with longitudinal slots 27 and 28, respectively. The valve 40 is formed with a centrally disposed recess 41 and two peripheral ports 44 and 46, which communicate with the central recess 41. The central recess 41 also communicates with the control port 32 of the casing 30.

The valve 40 is operatively connected by means of a tang 47 to an arm 50 having a bifurcated end portion 51, which is rotatably supported on the pad 21. The arm 50 includes a second bifurcated end portion 52 within which a vane 53 is supported by means of a bolt 54 and an integral hub portion 55. The vane 53 may be adjusted relative to the arm 50 by loosening the nut 56, and after the vane has been adjusted, the nut 56 may again be tightened so as to maintain the arm and vane in fixed relationship. The arm 50 also has attached thereto a hook member 57 to which one end of a tension spring 58 is attached. The other end of the spring 58 is attached to a bracket 59 which is carried by the front plate 15 of the regulator structure.

In accordance with well known principles, centrifugal force will act on the arm 50 in the direction of arrow 60 during rotation of the propeller. Centrifugal force will thereby tend to effect counterclockwise movement of the arm 50, as viewed in Fig. 2, movement of the arm 50 under the urge of centrifugal force being opposed by the spring 58. The mass of the arm 50 together with the vane 53, and the force of spring 58, are chosen so that at a predetermined speed of propeller rotation, the oppositely acting force to which the arm 50 is subjected will be in equilibrium and, hence, the arm 50 will remain substantially stationary. However, should propeller speed increase above this equilibrium speed, or predetermined propeller speed, the arm 50 will move in a counterclockwise direction. Conversely, should propeller speed decrease, the pull of spring 58 will overcome the thrust of centrifugal force and move the arm 50 in a clockwise direction, as viewed in Fig. 2. Inasmuch as the arm 50 is operatively connected by means of tang 47 to the valve 40, it will be appreciated that movements of the arm in response to centrifugal force, or the spring 58, will impart rotation of the valve 40.

The vane 53 may be adjusted in either direction, as indicated by arrows 61 and 62. Furthermore, inasmuch as the vane 53 is disposed in the ring of hydraulic medium, adjustment of vane 53 in the direction of arrow 62 will function to increase the width of the inertia oil ring, indicated by dotted lines 63 and 64, while adjustment of vane 53 in the direction of arrow 61 will decrease the width of the inertia oil ring. The inertia forces acting on the vane 53 and transmitted to the arm 50 and the valve 40 are indicated by arrows 65 and 66 in Fig. 2. The direction of rotation of the regulator structure 14 and, hence, the propeller is indicated by the arrow 70 in Fig. 2.

With reference to Fig. 4, a simplified fluid pressure system incorporating the governor valve assembly of this invention is depicted. The simplified fluid pressure system is shown including a source of fluid under low pressure 80 and a source of fluid under high pressure 85. A source of low pressure fluid 80 is connected by conduit 81 to the passage in the front wall 15 of the regulator, which communicates with passage 24 in the pad 21. This low pressure fluid also communicates with cylinder ports 33 and 35, while cylinder ports 34 and 36 constitute drain ports which are connected to the port 31. The low pressure fluid from source 80 also communicates with an actuating chamber 91 of a servo actuated pitch changing, or distributor valve, indicated generally by the numeral 90. The valve 90 includes a casing 92 having disposed therein a plunger 93 having spaced lands 94, 95, 96 and 97. The valve housing 92 includes a supply port 98 to which the high pressure source 85 is connected by conduit 86. In addition, the valve casing 92 includes a pair of control ports 99 and 100, as well as a drain port 101. The port 32 of the casing 30, as shown in Fig. 3, is connected by a conduit 87 to a second actuating chamber 89 of the valve 90. Furthermore, as seen in Fig. 4, the plunger 93 is formed with a central passage 102, which connects with transversely disposed passages 103 and 104 that connect with the annular grooves between lands 94 and 95, and 96 and 97, respectively.

The control ports 99 and 100 are connected to conduits 109 and 110, respectively, which communicate with a decrease pitch chamber 111 and an increase pitch chamber 112 of a servo-motor 120. The servo-motor 120 is shown schematically as including a cylinder 121 having disposed therein a reciprocable piston 122 having substantially equal areas on opposite sides thereof opposed to chambers 111 and 112. The piston 122 is shown schematically as being operatively connected by a rod 123 to a propeller blade 13, such that upward movement of the piston 122, as viewed in Fig. 4, will increase the pitch position of a propeller blade, while downward movement of the piston 122 will decrease the pitch position of the propeller blade.

The plunger 93 is also shown having a rod portion 105 having formed thereon a rack 106, which engages a circular rack 107 formed on a member, which is attached to the casing 30. Thus, the area of the plunger exposed to actuating chamber 91 is less than the area of the plunger exposed to actuating chamber 89. Accordingly, low pressure fluid is continuously supplied to actuator chamber 91, while the supply and drain of low pressure fluid from actuating chamber 89 is controlled by the governor valve assembly 20. It will further be appreciated that when the ports of valve 40 neither communicate with supply nor drain, the fluid medium in chamber 89 will be trapped therein, thereby preventing movement of the plunger 93.

*Operation*

When the propeller is rotating at the selected speed, the valve 40 will be in an equilibrium position wherein conduit 87 is neither connected to drain nor to the low pressure supply. Accordingly, the distributor valve plunger 93 will be maintained in an equilibrium position wherein lands 95 and 96 block ports 99 and 100, respectively, whereby propeller pitch is maintained substantially fixed. However, if the propeller should experience an overspeed, the arm 50 will move in a counterclockwise direction, as viewed in Fig. 2, thereby connecting ports 44 and 46 with ports 34 and 36, respectively, so that fluid will be drained from the actuating chamber 89. Thus, the plunger 93 will move downwardly, as viewed in Fig. 4, thereby connecting port 98 with port 100, while connecting port 99 with port 101. Accordingly, fluid pressure will be supplied to the servo-motor 120 so as to increase propeller pitch, which will tend to reduce propeller speed in a known manner. Movement of the plunger 93 in a downward direction will effect counterclockwise rotation of the casing 30, as viewed in Figs. 2 and 4, thereby repositioning the casing so as to interrupt the drain of fluid from the actuating chamber 89. However, movement of the valve 40 is proportional both to the amount of speed error and the rate of change of speed error. Movements of the valve 40 in response to the rate of change of speed error are controlled by the inertia forces as opposed by spring 58. Thus, when the propeller accelerates, the vane 53 will lag the regulator and when the propeller decelerates, the vane 53 will lead the regulator. Accordingly, during an acceleration condition, the acceleration sensitive means will tend to assist movement of the arm 50 in response to centrifugal force and thereby increase the amount of overspeed correction, which can be effected by the valve 40. Conversely, when the propeller decelerates, the vane 53 will lead the regulator so as to assist the pull of the spring 58.

As the propeller returns to the on-speed condition, due to an increase in the pitch position, the spring 58 will overcome the thrust of centrifugal force and thereby effect rotation of the arm 50 and the valve 40 in a clockwise direction, as viewed in Fig. 2, thereby placing ports 44 and 46 of the valve in communication with pressure ports 33 and 35 of the casing. In this manner, the low pressure fluid in actuating chamber 89 will effect upward movement of the plunger 93, as viewed in Fig. 4, so as to discontinue the application of pressure fluid to the increase pitch chamber 112. At the same time, movement of the plunger 93 will reposition the casing 30 through the rack connections therebetween. Thus, when the on-speed condition is again reached by the propeller, the arm 50 will be in the equilibrium position, as will the casing and valve of the governor valve assembly.

During underspeed conditions of the propeller, the action of the governor valve assembly and the distributor valve is the opposite of that described in conjunction with an overspeed condition. The correction rate of the acceleration sensitive means may be varied by adjusting the angular position of the vane 53. Inasmuch as adjustment of the vane 53 has no effect whatsoever on the mass of arm 50, the speed sensitivity of the governor valve assembly will not be affected by adjusting the acceleration correction rate. Moreover, the flow forces on the relatively movable parts of the governor valve assembly will be of negligible value inasmuch as they are opposed by a relatively large amount of inertia.

While the embodiment of the present invention as herein disclosed constitutes a preferred form, it is to be understood that other forms might be adopted.

What is claimed is as follows:

1. A governor assembly including in combination, a rotatable structure containing a quantity of fluid medium which forms a ring during rotation of said structure, a pair of relatively movable elements supported by said rotatable structure with the axes of said elements parallel to the axis of rotation of said structure, a member attached to one of said elements at a point spaced from the axis of rotation of said structure so as to be movable outwardly in response to the thrust of centrifugal force for effecting movement of said one element, inertia means carried by said member and positioned in said fluid medium ring, resilient means connected to said member for opposing outward movement thereof under the urge of centrifugal force or inertia forces, and means for adjusting the position of the inertia means relative to said member.

2. A governor assembly including in combination, a rotatable structure containing a quantity of fluid medium which forms a ring during rotation of said structure, relatively movable casing and valve elements supported by said rotatable structure with the axes of said element parallel to the axis of rotation of said structure, a member attached to said valve element at a point spaced from the axis of rotation of said structure so as to be movable outwardly in response to centrifugal force, resilient means for opposing movement of said member under the urge of centrifugal force, inertia means carried by said member and positioned in said fluid medium ring, and means for adjusting the position of said inertia means relative to said member.

3. A governor assembly including in combination, a rotatable structure containing a quantity of fluid medium which forms a ring during rotation of said structure, a pair of relatively movable elements supported by said rotatable structure with the axes of said elements parallel to the axis of rotation of said structure, a member connected to one of said elements at a point spaced from the axis of rotation of said structure so as to be movable outwardly in response to centrifugal force, resilient means for opposing outward movement of said member in response to centrifugal force, an inertia responsive vane carried by said member and positioned in said fluid medium ring, and means for adjusting the position of said vane relative to said member.

4. A governor assembly including in combination, a rotatable structure containing a quantity of fluid medium which forms a ring during rotation of said structure, relatively rotatable casing and valve elements supported by said rotatable structure with the axes of said casing and said valve parallel to the axis of rotation of said structure, an arm attached to said valve element at a point spaced from the axis of rotation of said structure so as to be movable outwardly in response to centrifugal force, resilient means for opposing outward movement of said arm in response to centrifugal force, a vane carried by said arm and positioned in said fluid medium ring, and means for adjusting the angular position of said vane relative to the arm.

5. A governor assembly including in combination, a rotatable structure containing a quantity of fluid medium which forms a ring during rotation of said structure, relative movable casing and valve elements supported by said rotatable structure with the axes of said elements parallel to the axis of rotation of said structure, a member connected to one of said elements at a point spaced from the axis of rotation of said structure so as to be movable outwardly in response to centrifugal force, resilient means for opposing outward movement of said member in response to centrifugal force, and an angularly adjustable vane carried by said member and positioned in said fluid medium ring.

6. A governor assembly including in combination, a rotatable structure containing a quantity of fluid medium which forms a ring during rotation of said structure, relatively rotatable casing and valve elements supported by said structure with the axes of said elements parallel to the axis of rotation of said structure, an arm attached to said valve at a point spaced from the axis of rotation of said structure so as to be movable outwardly in response to centrifugal force, a spring, one end of which is connected to said arm and the other end of which is connected to said rotatable structure, for opposing outward movement of said arm in response to centrifugal force, and an angularly adjustable vane carried by said arm and positioned in said fluid medium ring.

References Cited in the file of this patent

UNITED STATES PATENTS

| | | |
|---|---|---|
| 527,720 | Rites | Oct. 16, 1894 |
| 626,800 | Wilson | June 13, 1899 |
| 680,677 | Sturgess | Aug. 13, 1901 |
| 1,046,443 | Crist | Dec. 10, 1912 |
| 2,247,989 | Cita | July 1, 1941 |
| 2,660,421 | Sorensen | Nov. 24, 1953 |
| 2,754,106 | Ifield | July 10, 1956 |